United States Patent Office 3,580,941
Patented May 25, 1971

3,580,941
AMINOCYCLOTETRASILOZANES
Christopher A. Pearce and Norman C. Lloyd, Glamorgan, Wales, assignors to Midland Silicones Limited, Reading, England
No Drawing. Original application May 21, 1968, Ser. No. 730,940, now Patent No. 3,518,290, dated June 30, 1970. Divided and this application Feb. 19, 1970, Ser. No. 12,836
Claims priority, application Great Britain, May 26, 1967, 24,693/67
Int. Cl. C07f 7/02
U.S. Cl. 260—448.2  3 Claims

ABSTRACT OF THE DISCLOSURE

Novel compositions of matter and processes for preparing bicyclo- and aminocyclotetrasilazanes. The aminocyclotetrasilazanes are used to form bicyclotetrasilazanes by heating at temperatures above 210° C. under substantially anhydrous conditions.

---

This application is a divisional application based on U.S. Pat. application Ser. No. 730,940, filed May 21, 1968, and now U.S. Pat. No. 3,518,290, wherein right of Convention Priority based on United Kingdom application No. 24,693/67, filed May 26, 1967, is claimed.

This invention relates to novel organosilicon compounds wherein there are present silicon atoms linked to nitrogen atoms and also relates to a process for the preparation of such compounds.

More particularly, this invention provides a novel composition of matter comprising a bicyclotetrasilazane of the general formula

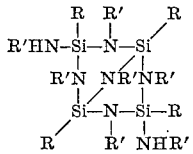

wherein each R represents an alkyl radical containing less than 6 carbon atoms, a monocyclic aryl radical, a vinyl radical or an allyl radical and each R' represents an alkyl radical containing less than 6 carbon atoms or an allyl radical. Preferably each R represents a methyl, ethyl or phenyl radical and each R' represents a methyl or ethyl radical.

The novel bicyclotetrasilazanes of this invention can be prepared by heating, under substantially anhydrous conditions, a tris-(amino)silane of the general formula RSi(NHR')₃ wherein R and R' have the significance noted above. Methods of preparing the tris-(amino)silanes are well known in the art. One convenient method comprises reacting an organothichlorosilane with the appropriate amine, for example, a methylamine or ethylamine.

In order to obtain the desired compound, the tris-(amino)silane should be heated to a temperature above 210° C. and this invention includes such a process. The actual temperature employed will depend mainly on the nature of the R' groups and to some extent on the R groups. The larger molecular weight radicals in general require the use of higher tmeperatures. The reaction time required can be reduced by the use of a catalyst and the preferred catalysts being acidic materials such as sulphuric acid, ammonium sulphate and alkylammonium salts which are capable of acting as a proton source at the reaction temperature. In general, the use of a catalyst in the reaction is preferred as this significantly reduces the reaction temperature in addition to shortening the reaction time.

Subject to volatility considerations, the formation of the desired product can be followed by a gas chromatography technique thus enabling the optimum reaction conditions to be obtained for the lower values of R'. As an indication of the temperatures at which the bicyclotetrasilazanes can be obtained we have found that when R' represents the propyl radical and R the methyl radical, the bicyclotetrasilazane is formed at about 330° C. when the appropriate tris-(amino)silane is heated in the presence of from about 0.005 to 0.1 moles of catalyst per mole of silane. When R' is the ethyl radical and R is methyl, a temperature of about 300 to 320° C. is required to provide the desired bicyclotetrasilazane in the presence of about 0.005 to 0.010 moles of catalyst per mole of the tris-(amino)silane. When R' is methyl, a correspondingly lower temperature can be used for the same catalyst concentration.

In view of the susceptibility to hydrolysis of the silicon-nitrogen linkages in the tris-(amino)silane, the reaction is performed under substantially anhydrous conditions, for example, under dry nitrogen or other inert gas.

The tris-(amino)silane can be dissolved in a solvent prior to the heating step. The presence of a solvent is not, however, essential and the choice of a suitable organic solvent can be difficult in view of the relatively high temperatures employed.

Formation of the bicyclotetrasilazanes of this invention from the tris-(amino)silane has been found to proceed via amino-cyclodisilazanes of the general formula

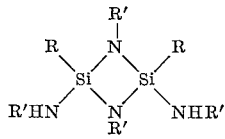

wherein R and R' are as hereinbefore defined. These novel aminocyclodisilazanes are formed at temperatures lower than those required for the preparation of the corresponding bicyclotetrasilazanes but above 130° C. For example, the cyclodisilazane in which R represents methyl and R' the propyl radical can be obtained at temperatures of about 170 to 180° C. in the presence of about 0.005 mole of acidic catalyst per mole of tris-(amino)silane. When R represents the methyl radical and R' the ethyl radical, the cyclodisilazane can be obtained at about 140° C. in the presence of a similar proportion of the catalyst. Such cyclodisilazanes can be isolated and are also included within the scope of this invention. The most readily isolated and, therefore, preferred cyclodisilazanes are those in which R is selected from methyl, ethyl and phenyl radicals and R' is selected from ethyl and n-propyl radicals.

The cyclodisilazanes can be prepared and isolated and thereafter heated, preferably in the presence of an acid catalyst, to provide the corresponding bicyclotetrasilazanes. In general, however, no advantage is seen in interrupting the process in this manner. Also formed as intermediate products during the process are compounds of the formula [RSi(NHR')NR']₃. If desired, these cyclotrisilazanes can also be isolated and employed as starting materials for the production of the novel bicyclotetrasilazanes. A further aspect of this invention, therefore, resides in a process for the preparation of a bicyclotetrasilazane which comprises heating under substantially anhydrous conditions and to a temperature above 210° C. an aminocyclosilazane of the general formula [RSi(NHR')NR']ₓ wherein $x$ has a value of 2 or 3 and R and R' are as hereinbefore defined.

The bicyclotetrasilazanes of this invention can exist in three isomeric forms depending on the relative positions of the —NHR' and —R groups attached to each of the two silicon atoms. Preparation of the compounds according to the process described herein leads to a mixture of all three isomeric forms. The bicyclotetrasilazanes are useful as starting materials for the preparation of silazane polymers, as intermediates in the preparation of silazane-siloxane copolymers and as cross-linking agents for siloxane polymers.

The following examples illustrate the invention.

EXAMPLE 1

Methyl-tris-(ethylamino)silane (33.0 g.) was heated at 140° C. for 8 hours in the presence of ammonium sulphate (0.126 g., 0.005 molar ratio) in an atmosphere of dry argon, the ethylamine evolved being allowed to escape to the atmosphere. The pyrolysate was fractionally distilled at reduced pressure yielding (after removal of the unreacted starting material) 2,4-dimethyl-1,3-diethyl-2,4-bis(ethylamino)-cyclodisilazane [MeSi(NHEt)NEt]$_2$ (7.9 g., 32%) a colorless liquid B.P. 33°/0.05 mm. $n_D^{25}$ 1.4416. Found (percent): C, 46.3; H, 10.7; N, 20.3; Si, 21.3; M (by mass spectrum) 260. Calculated for $C_{10}H_{28}N_4Si_2$ (percent): C, 46.2; H, 10.8; N, 21.5; Si, 21.5; M, 260. The structure of the product was confirmed by infrared and NMR (Nuclear Magnetic Resonance) spectroscopy.

EXAMPLE 2

Methyl-tris-(ethylamino)silane (267 g.) was gradually heated up to 345° over a period of 97 hours in the presence of sulphuric acid (1.16 g., 0.0078 molar ratio) in an atmosphere of dry argon, ethylamine being evolved. Fractional distillation of the pyrolysate at reduced pressure yielded N-pentaethyl-bis-(ethylamino)tetramethylbicyclotetrasilazane Me$_4$Si$_4$(NEt)$_5$(NHEt)$_2$ (66.2 g.; 36%) B.P. 140–147°/0.6 mm. which solidified to colorless waxy crystals M.P. 84°. Found (percent): C, 45.4; H, 10.5; N, 20.8; Si, 23.8; M (by mass spectrum 475). Calculated for $C_{18}H_{49}N_7Si_4$ (percent): C, 45.4; H, 10.3; N, 20.6; Si, 23.6; M, 475. The structure of the product was confirmed by infrared and NMR (Nuclear Magnetic Resonance) spectroscopy.

EXAMPLE 3

Methyl-tris-(methylamino)silane (112 g.) was heated in the presence of sulphuric acid (0.166 g., 0.002 molar ratio) in an atmosphere of dry argon. The temperature was raised to 210° gradually over a period of 120 hours and maintained at between 210° and 250° for a further 140 hours. Methylamine was evolved rapidly at first and then more slowly. The composition of the pyrolysate was analyzed at intervals by gas chromatography and showed a ratio of bicyclotetrasilazane to cyclotrisilazane of approximately 3:2 at the end of the above pyrolysis. The pyrolysate mixture could not be separated by distillation in this case as the two major products were crystalline solids. Preparative gas chromatography was used to obtain a pure sample of N-pentamethyl-mis-(methylamino)tetramethylbicyclotetrasilazane, a colorless crystalline solid M.P. 135–150°. Found (percent): C, 34.9; H, 9.3; N, 25.4; Si, 30.2; M (mass spectrum) 377. Calculated for $C_{11}H_{35}N_7Si_4$ (percent): C, 35.0; H, 9.3; N, 26.0; Si, 29.7; M, 377. The structure was confirmed by infrared and NMR (Nuclear Magnetic Resonance) spectroscopy.

EXAMPLE 4

N - trimethyltriphenyltris - (methylamino)cyclotrisilazane (14.1 g.) (prepared from the acid catalyzed pyrolysis of phenyltris-(methylamino)silane) was heated at 300° to 330° for 282 hours in the presence of sulphuric acid (0.0093 g., 0.0033 molar ratio) in a dry argon atmosphere. Methylamine was evolved and gas chromatography analysis showed that the product contained some unreacted starting material and N-pentamethyl-bis-(methylamino)tetraphenylbicyclotetrasilazane, a colorless solid which was isolated by repeated fractional sublimation (1.7 g., 13%). Found (percent): C, 59.4; H, 7.3; N, 14.8; Si, 18.4. Calculated for $C_{31}H_{43}N_7Si_4$ (percent): C, 59.5; H, 6.9; N, 15.7; Si, 17.9.

EXAMPLE 5

When vinyltris-(methylamino)silane was heated in the presence of sulphuric acid in an atmosphere of dry argon and temperature was raised to 210° C. gradually over a period of 120 hours and maintained at between 210° C. and 250° C. for a further 140 hours, equivalent results were obtained.

That which is claimed is:

1. A novel composition of matter comprising an aminocyclodisilazane of the general formula

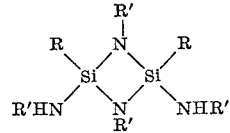

wherein each R represents an alkyl radical containing less than 6 carbon atoms, a monocyclic aryl radical, a vinyl radical or an allyl radical and each R' represents an alkyl radical containing less than 6 carbon atoms or an allyl radical.

2. A novel composition of matter as claimed in claim 1 wherein each R represents a methyl, ethyl or phenyl radical and each R' represents an ethyl radical or an n-propyl radical.

3. A novel composition of matter as claimed in claim 1 wherein the aminocyclodisilazane is 2,4-dimethyl-1,3-diethyl-2,4-bis(ethylamino)cyclodisilazane.

References Cited

UNITED STATES PATENTS

| | | | |
|---|---|---|---|
| 3,098,830 | 7/1963 | Rochow | 260—448.2X |
| 3,140,288 | 7/1964 | Peake | 260—448.2X |
| 3,239,489 | 3/1966 | Fink | 260—448.2X |
| 3,297,592 | 1/1967 | Fink | 260—448.2X |
| 3,320,184 | 5/1967 | Fink | 260—448.2X |
| 3,393,218 | 7/1968 | Van Wazer et al. | 260—448.2 |
| 3,414,584 | 12/1968 | Fink | 260—448.2X |

TOBIAS E. LEVOW, Primary Examiner

W. F. W. BELLAMY, Assistant Examiner